United States Patent
Wood et al.

(10) Patent No.: US 11,236,847 B2
(45) Date of Patent: Feb. 1, 2022

(54) PIPE

(71) Applicant: Victrex Manufacturing Limited, Lancashire (GB)

(72) Inventors: Alan Wood, Cumbria (GB); Horst Sandner, Waldems (DE)

(73) Assignee: Victrex Manufacturing Limited, Lancashire (GB)

( * ) Notice: Subject to any disclaimer, the term of this patent is extended or adjusted under 35 U.S.C. 154(b) by 137 days.

(21) Appl. No.: 16/165,795

(22) Filed: Oct. 19, 2018

(65) Prior Publication Data

US 2019/0120410 A1     Apr. 25, 2019

Related U.S. Application Data

(63) Continuation of application No. 13/983,598, filed as application No. PCT/GB2012/050267 on Feb. 7, 2012, now Pat. No. 10,107,421.

(30) Foreign Application Priority Data

Feb. 10, 2011   (GB) .................................. 1102388

(51) Int. Cl.
*F16L 9/12*     (2006.01)
*E21B 17/01*    (2006.01)
(Continued)

(52) U.S. Cl.
CPC ................. *F16L 9/12* (2013.01); *B29C 48/09* (2019.02); *B29C 48/903* (2019.02);
(Continued)

(58) Field of Classification Search
CPC ...... B29C 2035/1616; B29C 2791/006; B29C 47/0023; B29C 47/003; B29C 47/8835;
(Continued)

(56) References Cited

U.S. PATENT DOCUMENTS

| 5,286,814 A | 2/1994 | Mizuno et al. |
| 5,381,511 A * | 1/1995 | Bahar .................. F16L 11/12 392/472 |

(Continued)

FOREIGN PATENT DOCUMENTS

| EP | 0296877 A2 | 12/1988 |
| EP | 0950498 A1 | 10/1999 |

(Continued)

*Primary Examiner* — Yan Lan
(74) *Attorney, Agent, or Firm* — Hodgson Russ LLP

(57) ABSTRACT

A polyetheretherketone pipe of length greater than 250 meters and a residual stress of less than 5 MPa may be made using a calibrator device 2 which includes a cone shaped opening 6 arranged to receive a molten extruded pipe shaped polymer. Attached to the front member 4 is a vacuum plate 14a and successive vacuum plates 14b-14h are attached to one another to define an array of vacuum plates, the vacuum plates being arranged to allow a vacuum to be applied to a pipe precursor passing through opening 16. The vacuum plates 14 also include temperature control means for heating or cooling the plates and therefore heating or cooling a pipe precursor passing through the openings. With a vacuum applied to opening 6, 16 and heating/cooling the plates, an extruded hot plastics pipe is inserted into calibrator 2 via opening 6 and conveyed through opening 16 in plates 14, whereupon it is urged by the vacuum against the cylindrical surface defined by plates 14 to maintain its shape and the temperature of each plate is controlled to control the rate of cooling of the pipe precursor passing through. The pipe may be cooled at a relatively slow rate so that a pipe made from a relatively fast crystallising polymer crystalises and the crystallinity of the pipe along its extent and throughout its thickness is substantially constant.

1 Claim, 6 Drawing Sheets

(51) Int. Cl.
*C08J 5/00* (2006.01)
*B29C 71/00* (2006.01)
*F16L 11/06* (2006.01)
*B29C 48/09* (2019.01)
*B29C 48/90* (2019.01)
*B29C 48/88* (2019.01)
*B29C 48/14* (2019.01)
*B29C 71/02* (2006.01)
*B29K 71/00* (2006.01)

(52) U.S. Cl.
CPC ............. *B29C 71/0063* (2013.01); *C08J 5/00* (2013.01); *E21B 17/01* (2013.01); *F16L 11/06* (2013.01); *B29C 48/1474* (2019.02); *B29C 48/904* (2019.02); *B29C 48/913* (2019.02); *B29C 48/916* (2019.02); *B29C 48/9135* (2019.02); *B29C 71/02* (2013.01); *B29C 2791/006* (2013.01); *B29K 2071/00* (2013.01); *C08J 2371/10* (2013.01); *C08J 2381/02* (2013.01)

(58) Field of Classification Search
CPC ... B29C 47/884; B29C 47/8865; B29C 47/90; B29C 47/904; B29C 47/905; B29C 63/34; B29C 63/42; B29C 48/09; B29C 48/1474; B29C 48/903; B29C 48/904; B29C 48/913; B29C 48/9135; B29C 48/916; B29C 71/0063; B29C 71/02; B29C 48/32; B29C 48/88; F16L 55/1654; F16L 55/1657; F16L 9/12; F16L 11/06; Y10T 29/4973; Y10T 29/49732; Y10T 29/49746; Y10T 29/49865; Y10T 29/49885; B29K 2071/00; C08J 2371/10; C08J 2381/02; C08J 5/00; E21B 17/01
See application file for complete search history.

(56) References Cited

U.S. PATENT DOCUMENTS

| | | |
|---|---|---|
| 6,287,102 B1 | 9/2001 | Franz et al. |
| 2004/0166267 A1 | 8/2004 | Ohta et al. |
| 2007/0256470 A1 | 11/2007 | Gruber et al. |
| 2008/0196900 A1* | 8/2008 | Leibfried ............ E21B 36/003 166/380 |
| 2011/0212290 A1 | 9/2011 | Crawley |

FOREIGN PATENT DOCUMENTS

| | | |
|---|---|---|
| JP | 02-059330 | 2/1990 |
| SU | 1412985 | 7/1988 |
| WO | 2007/023253 A1 | 3/2007 |
| WO | 2010043888 A1 | 4/2010 |

* cited by examiner

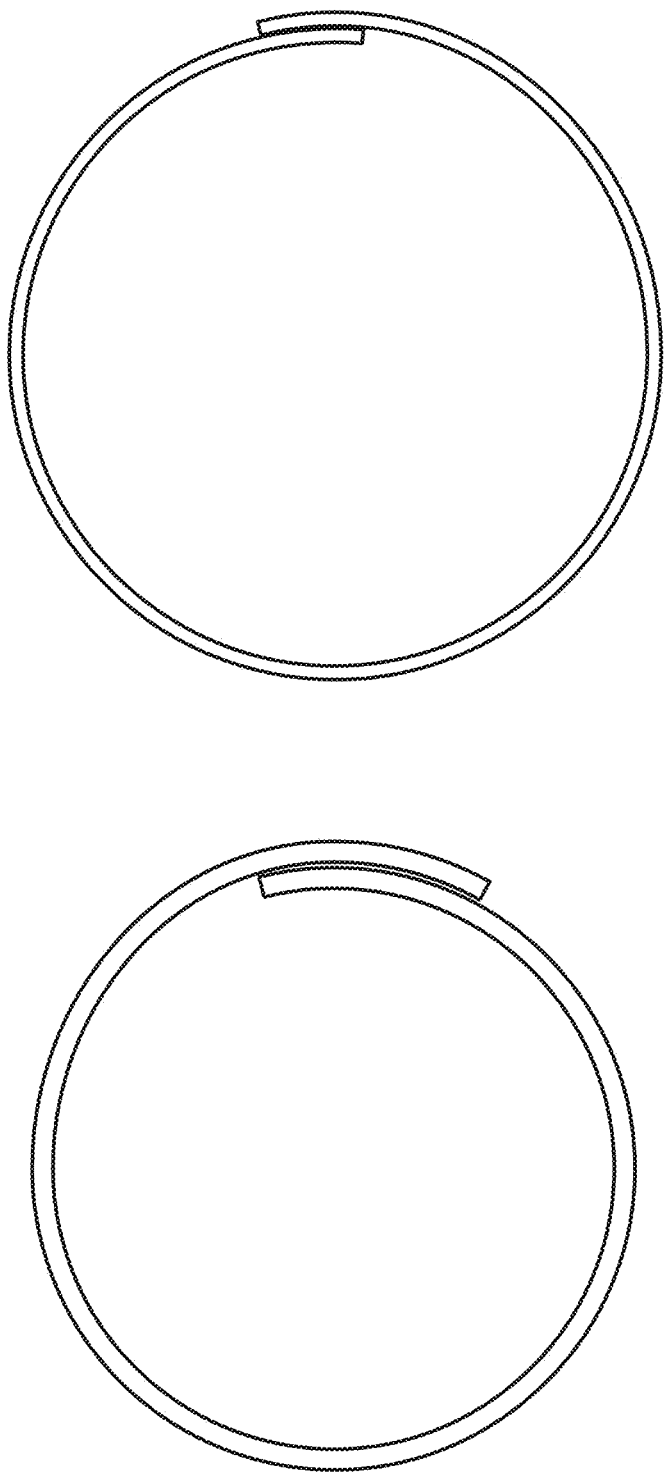

PIPE

CROSS-REFERENCE TO RELATED APPLICATIONS

This application is a continuation of U.S. patent application Ser. No. 13/983,598 filed on Aug. 5, 2013, which is a national stage entry of International Application No. PCT/GB2012/050267 filed on Feb. 7, 2012, which claims priority to United Kingdom Application No. 1102388.4 filed on Feb. 10, 2011.

BACKGROUND OF THE DISCLOSURE

This invention relates to a pipe and particularly, although not exclusively, relates to a pipe per se and methods of producing a pipe. Embodiments aim to extend the lifetime and/or reduce the risk of premature failure of a pipe which may carry a high pressure fluid (e.g. liquid (optionally containing particulates), gas or a mixture of the two) and/or be subjected to high external forces, in use. Preferred embodiments relate to pipes for use in the oil and/or gas industries for example flexible risers arranged to transport fluids between floating production units and a sub-sea wellhead. Other preferred embodiments may be used in the aerospace industry, in process industries, in geometrical and mining industries and in industry in general.

It is well known to produce pipes by extruding molten polymers through a suitably shaped die and water quenching the extruded pipe, for example by directing it into a cool water bath and/or by spraying cool water on its outside. However, for fast crystallizing polymers and/or polymers having a relatively high glass transition temperature such methods may produce pipes which have significant differences in crystallinity from the outside to the inside of the pipe wall. For example, the outside wall of the pipe may have an amorphous (or very low crystallinity) skin due to rapid quenching of an extruded melt used in making the pipe, whereas on moving inwards, the crystallinity of the pipe wall may increase significantly. Such differences in crystallinity across the pipe wall lead to residual hoop stress. For example, in a 4.2 inch (10.6 cm) outside diameter (OD) pipe, the residual hoop stress (calculated as described hereinafter) may be in excess of 5.6 MPa. In general, residual stress may be caused by molecular orientation frozen in during the manufacturing process or thermal stresses due to different cooling rates. Such residual stress is a consequence of the thermal contraction of the melt being restricted during non-uniform solidification which freezes in a strain. Such high residual stress can lead to problems. For example, if such pipes are sawn, the pipe may shatter as the stresses are released. Alternatively, and/or additionally, the pipes may be more susceptible to failure through fatigue and/or stress in use. A highly stressed pipe is more likely to fail (e.g. crack catastrophically) in a shorter time in use than a pipe with lower residual stress.

It is desirable to maximise the useful lifetimes of pipes and/or reduce the risk of premature failure. It is an object of the present invention to address this problem.

BRIEF SUMMARY OF THE DISCLOSURE

According to a first aspect of the invention, there is provided a pipe having a length of at least 1 m and a residual stress of less than 5 MPa, wherein said pipe comprises:
(i) a polymeric material which includes:
  (a) phenyl moieties;
  (b) ether and/or thioether moieties; and, optionally,
  (c) ketone and/or sulphone moieties; and/or
(ii) a polymeric material with a crystallinity half-life ($t_{0.5}$) at 15° C. above its glass transition temperature (Tg) of less than 1000 seconds.

The residual stress may be measured by at least one of the methods in Example 1 hereinafter.

In the context of the present specification, the reference to a "pipe" includes articles that may alternatively be referred to as "tubes".

Said length of said pipe suitably refers to a continuous uninterrupted length of pipe. The length of pipe suitably does not comprise individual pipe sections which are joined to one another. Suitably the entire length of pipe is extrudable and/or extruded in a single extrusion process. The pipe suitably has a substantially constant cross-section along its entire extent. Said pipe preferably has a circular cross-section. Said pipe is suitably annular. Said pipe preferably has substantially smooth outer surface suitably across substantially its entire extent.

Said pipe may have a length of at least 2 m, at least 5 m, at least 8 m at least 10 m, suitably at least 15 m, preferably at least 50 m, more preferably at least 100 m, especially at least 250 m. In some cases the length may be greater than 1000 m.

In one embodiment, pipe is continuously extruded and, suitably, properties of the pipe, for example residual stress as described, are the same magnitude when assessed at a first end of the pipe, at a second end of the pipe opposite to that of the first end and in the middle of the pipe, exactly between said first and second ends. Such extruded pipe may be cut into a multiplicity, for example 0.5 m, 1 m or 2 m, lengths. Advantageously, the properties of the cut pipes of the same length (and suitably pipes of different lengths) are substantially the same as one another.

Said pipe may have an outside diameter of at least 0.6 cm, suitably at least 2.5 cm, preferably at least 7 cm, more preferably at least 10 cm, especially at least 15 cm. The diameter may be less than 50 cm, preferably less than 40 cm, more preferably less than 30 cm. In some embodiments (e.g. aerospace) the outside diameter may be in the range 12 mm to 50 mm.

The outer diameter of the pipe may be defined as "d" cm and the thickness of the pipe wall may be defined as "t" cm. The SDR of the pipe (defined as the diameter (d) to thickness (t) ratio) may be at least 6 and is suitably in the range 15 to 40.

The thickness of the wall which defines the pipe may be at least 0.5 mm, suitably is at least 0.8 mm, and preferably is 1 mm or more. The thickness may be less than 30 mm, suitably less than 15 mm, preferably less than 10 mm, more preferably less than 8 mm, especially less than 6 mm. The thickness is preferably in the range 0.6 mm to 6 mm.

Said pipe may have a residual stress of less than 4 MPa, suitably less than 3 MPa, preferably less than 2.5 MPa, especially 2 MPa or less.

It is preferred for the crystallinity across the cross-section of the pipe not to vary too much, thereby to minimise residual hoop stress. FTIR may be used to assess crystallinity and this may be used to assess the level of crystallinity at a surface and/or across the thickness of a sample. Reference is made to a paper titled "Crystallinity in Poly(Aryl-Ether-Ketone) Plaques Studied by Multiple Internal Reflection Spectroscopy" (Polymer Bull, 11, 433 (1984)). The difference in crystallinity between an outer surface of the pipe and an inner surface of the pipe, measured by FTIR as described, may be less than 10%, suitably less than 8%, preferably less than 6%, especially less than 4%. Suitably, the difference between the highest crystallinity at any position on the pipe and the lowest crystallinity at any position on the pipe is less than 10%, suitably less than 8%, preferably less than 6%, especially 4% or less.

Said polymeric material is suitably semi-crystalline and may be such that the kinetics of crystallisation are so fast that it is substantially impossible to produce a solid from the polymeric material which is fully amorphous. For example, the crystallinity half-life ($t_{0.5}$) of the polymeric material at 15° C. above its Tg may be less than 1000 seconds, less than 500 seconds, less than 250 seconds, or less than 150 seconds determined in accordance with the description in J. Brandrup, E. H. Immergut and E. A. Grulke, *Polymer Handbook* 4$^{th}$ *Edition*, Wiley Interscience, 1999, ISBN 0-471-47936-5 (Vol 1) and 0-471-48172-6 (Vol 2).

On the aforementioned basis the $t_{0.5}$ for polyetheretherketone at 160° C. (which is close to 15° C. above its Tg) is 126 seconds which indicates that crystallisation occurs very rapidly.

Said pipe preferably comprises, more preferably consists essentially of, a single said polymeric material or a single homogenous polymeric composition comprising said polymeric material. Thus, said pipe is preferably substantially homogenous, although it may comprise a polymer having different levels of crystallinity (as described above) between an inside and outside surface of the pipe. Said pipe preferably consists essentially of a single said polymeric material.

Said polymeric material suitably has a Tg of greater than 50° C., preferably greater than 75° C., more preferably greater than 85° C. or greater than 100° C. Said polymeric material may have a Tg of less than 260° C., for example less than 220° C. or less than 200° C. In some cases, the Tg may be less than 190° C., 180° C. or 170° C. Said, polymeric material preferably has a Tg of greater than 50° C., more preferably greater than 80° C., especially greater than 120° C.

Said polymeric material suitably has a melt viscosity (MV) of at least 0.06 kNsm$^{-2}$, preferably has a MV of at least 0.08 kNsm$^{-2}$, more preferably at least 0.085 kNsm$^{-2}$, especially at least 0.09 kNsm$^{-2}$. MV is suitably measured using capillary rheometry operating at 400° C. at a shear rate of 1000 s$^{-1}$ using a tungsten carbide die, 0.5×3.175 mm. Said polymeric material may have a MV of less than 1.00 kNsm$^{-2}$, suitably less than 0.8 kNsm$^{-2}$.

Said polymeric material may have a tensile strength, measured in accordance with ASTM D790 of at least 40 MPa, preferably at least 60 MPa, more preferably at least 80 MPa. The tensile strength is preferably in the range 80-110 MPa.

Said polymeric material may have a flexural strength, measured in accordance with ASTM D790 of at least 145 MPa. The flexural strength is preferably in the range 145-180 MPa, more preferably in the range 145-165 MPa.

Said polymeric material may have a flexural modulus, measured in accordance with ASTM D790, of at least 2 GPa, preferably at least 3 GPa, more preferably at least 3.5 GPa. The flexural modulus is preferably in the range 3.5-4.5 GPa, more preferably in the range 3.5-4.1 GPa.

Preferably, said polymeric material has a moiety of formula

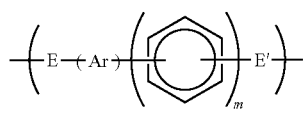

I and/or a moiety of formula

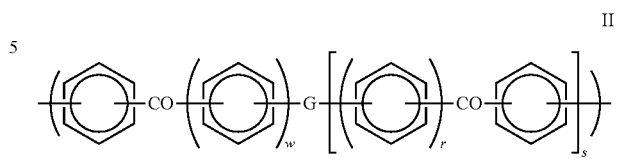

II and/or a moiety of formula

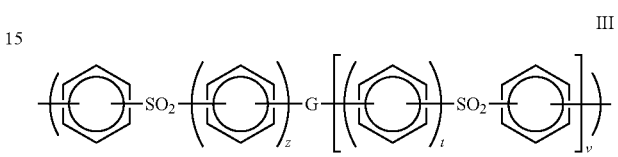

III wherein m, r, s, t, v, w and z independently represent zero or a positive integer, E and E' independently represent an oxygen or a sulphur atom or a direct link, G represents an oxygen or sulphur atom, a direct link or a —O-Ph-O— moiety where Ph represents a phenyl group and Ar is selected from one of the following moieties (i)**, (i) to (iv) which is bonded via one or more of its phenyl moieties to adjacent moieties

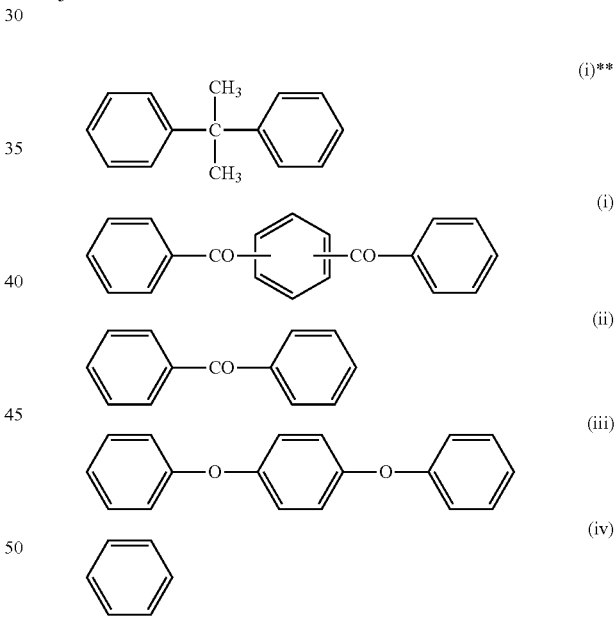

Unless otherwise stated in this specification, a phenyl moiety has 1,4-, linkages to moieties to which it is bonded.

In (i), the middle phenyl may be 1,4- or 1,3-substituted. It is preferably 1,4-substituted.

In one embodiment, a polymeric material may comprise a repeat unit of formula I and no other repeat units. Said polymeric material may be polyphenylenesulphide (PPS).

In a preferred embodiment, said polymeric material may include more than one different type of repeat unit of formula I; and more than one different type of repeat unit of formula II; and more than one different type of repeat unit of formula III. Preferably, however, only one type of repeat unit of formula I, II and/or III is provided.

Said moieties I, II and III are suitably repeat units. In the polymeric material, units I, II and/or III are suitably bonded to one another—that is, with no other atoms or groups being bonded between units I, II and III.

Phenyl moieties in units I, II and III are preferably not substituted. Said phenyl moieties are preferably not cross-linked.

Where w and/or z is/are greater than zero, the respective phenylene moieties may independently have 1,4- or 1,3-linkages to the other moieties in the repeat units of formulae II and/or III. Preferably, said phenylene moieties have 1,4-linkages.

Preferably, the polymeric chain of the polymeric material does not include a —S— moiety. Preferably, G represents a direct link.

Suitably, "a" represents the mole % of units of formula I in said polymeric material, suitably wherein each unit I is the same; "b" represents the mole % of units of formula II in said polymeric material, suitably wherein each unit II is the same; and "c" represents the mole % of units of formula III in said polymeric material, suitably wherein each unit III is the same. Preferably, a is in the range 45-100, more preferably in the range 45-55, especially in the range 48-52. Preferably, the sum of b and c is in the range 0-55, more preferably in the range 45-55, especially in the range 48-52. Preferably, the ratio of a to the sum of b and c is in the range 0.9 to 1.1 and, more preferably, is about 1. Suitably, the sum of a, b and c is at least 90, preferably at least 95, more preferably at least 99, especially about 100. Suitably b is at least 20, preferably at least 40, more preferably at least 45. Preferably, a is 20 or less, preferably 10 or less, more preferably 5 or less. Preferably, said polymeric material consists essentially of moieties I, II and/or III.

Said polymeric material may be a homopolymer having a repeat unit of general formula 0-3, more preferably 0-2, especially 0-1. Preferably, s is 0 or 1. Preferably v is 0 or 1. Preferably, w is 0 or 1. Preferably z is 0 or 1.

Preferably, said polymeric material is a homopolymer having a repeat unit of general formula IV.

Preferably Ar is selected from the following moieties (xi)** and (vii) to (x)

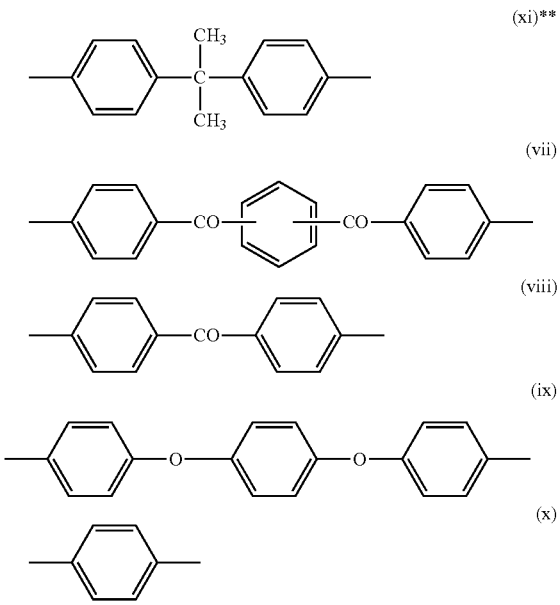

In (vii), the middle phenyl may be 1,4- or 1,3-substituted. It is preferably 1,4-substituted.

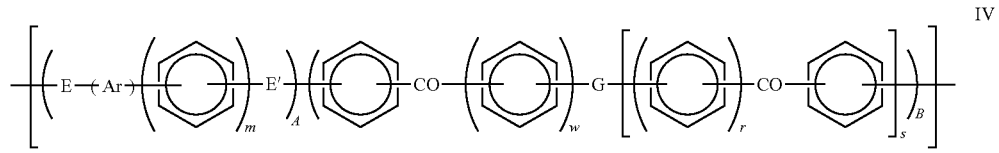

or a homopolymer having a repeat unit of general formula

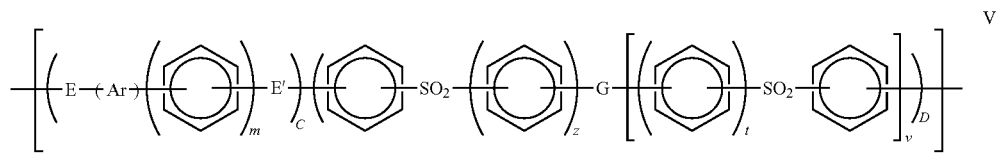

or a random or block copolymer of at least two different units of IV and/or V wherein A, B, C and D independently represent 0 or 1 and E, E', G, Ar, m, r, s, t, v, w and z are as described in any statement herein.

Suitably in IV, at least one of A and B represents 1. Suitably in V at least one of C and D represents 1.

Preferably, m is in the range 0-3, more preferably 0-2, especially 0-1. Preferably, r is in the range 0-3, more preferably 0-2, especially 0-1. Preferably t is in the range Suitable moieties Ar are moieties (i), (ii), (iii) and (iv) and, of these, moieties (i), (ii) and (iv) are preferred. Other preferred moieties Ar are moieties (vii), (viii), (ix) and (x) and, of these, moieties (vii), (viii) and (x) are especially preferred.

Said polymeric material suitably includes at least 60 mole %, preferably at least 70 mole %, more preferably at least 80 mole %, especially at least 90 mole % of repeat units which do not include —S— or —$SO_2$— moieties. Said polymeric material suitably includes at least 60 mole %, preferably at least 70 mole %, more preferably at least 80 mole %, especially at least 90 mole % of repeat units which consist essentially of phenyl moieties, ether moieties and ketone moieties.

An especially preferred class of polymeric materials are polymers (or copolymers) which consist essentially of phenyl moieties in conjunction with ketone and/or ether moieties. That is, in the preferred class, the polymeric material does not include repeat units which include —S—, —SO$_2$— or aromatic groups other than phenyl. Preferred polymeric materials of the type described include:

(a) a polymer consisting essentially of units of formula IV wherein Ar represents moiety (iv), E and E' represent oxygen atoms, m represents 0, w represents 1, G represents a direct link, s represents 0, and A and B represent 1 (i.e. polyetheretherketone).

(b) a polymer consisting essentially of units of formula IV wherein E represents an oxygen atom, E' represents a direct link, Ar represents a moiety of structure (i), m represents 0, A represents 1, B represents 0 (i.e. polyetherketone);

(c) a polymer consisting essentially of units of formula IV wherein E represents an oxygen atom, Ar represents moiety (i), m represents 0, E' represents a direct link, A represents 1, B represents 0, (i.e. polyetherketoneketone).

(d) a polymer consisting essentially of units of formula IV wherein Ar represents moiety (i), E and E' represent oxygen atoms, G represents a direct link, m represents 0, w represents 1, r represents 0, s represents 1 and A and B represent 1. (i.e. polyetherketoneetherketoneketone).

(e) a polymer consisting essentially of units of formula IV, wherein Ar represents moiety (iv), E and E' represents oxygen atoms, G represents a direct link, m represents 0, w represents 0, s, r, A and B represent 1 (i.e. polyetheretherketoneketone).

(f) a polymer comprising units of formula IV, wherein Ar represents moiety (iv), E and E' represent oxygen atoms, m represents 1, w represents 1, A represents 1, B represents 1, r and s represent 0 and G represents a direct link (i.e. polyether-diphenyl-ether-phenyl-ketone-phenyl-).

The main peak of the melting endotherm (Tm) for said polymeric material may be at least 300° C.

Said polymeric material may consist essentially of one of units (a) to (f) defined above.

Said polymeric material preferably comprises, more preferably consists essentially of, a repeat unit of formula (XX)

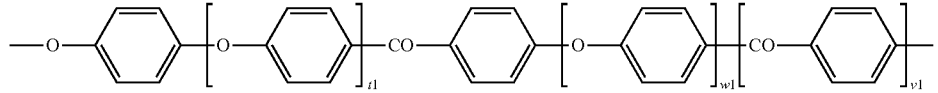

where t1, and w1 independently represent 0 or 1 and v1 represents 0, 1 or 2. Preferred polymeric materials have a said repeat unit wherein t1=1, v1=0 and w1=0; t1=0, v1=0 and w1=0; t1=0, w1=1, v1=2; or t1=0, v1=1 and w1=0. More preferred have t1=1, v1=0 and w1=0; or t1=0, v1=0 and w1=0. The most preferred has t1=1, v1=0 and w1=0.

In preferred embodiments, said polymeric material is selected from polyetheretherketone, polyetherketone, polyetherketoneetherketoneketone and polyetherketoneketone. In a more preferred embodiment, said polymeric material is selected from polyetherketone and polyetheretherketone. In an especially preferred embodiment, said polymeric material is polyetheretherketone.

Said pipe may comprise or consist essentially of a polymeric composition which includes said polymeric material and one or more fillers.

Said polymeric material may make up at least 60 wt %, suitably at least 70 wt %, preferably at least 80 wt %, more preferably at least 90 wt %, especially at least 95 wt %, of the total amount of thermoplastic polymeric materials in said polymeric composition from which said pipe is made.

A single said polymeric material is preferably substantially the only thermoplastic polymer in said polymeric composition. Suitably, a reference to a thermoplastic polymer refers to a polymer which is melted in the formation of said pipe.

A filler is suitably a material which is not melted in manufacture of said pipe. It suitably has a melting temperature of greater than 350° C.

Said filler may include a fibrous filler or a non-fibrous filler. Said filler may include both a fibrous filler and a non-fibrous filler. A said fibrous filler may be continuous or discontinuous. A said fibrous filler may be selected from inorganic fibrous materials, non-melting and high-melting organic fibrous materials, such as aramid fibres, and carbon fibre. A said fibrous filler may be selected from glass fiber, carbon fibre, asbestos fiber, silica fiber, alumina fiber, zirconia fiber, boron nitride fiber, silicon nitride fiber, boron fiber, fluorocarbon resin fibre and potassium titanate fiber. Preferred fibrous fillers are glass fibre and carbon fibre. A fibrous filler may comprise nanofibres.

A said non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin, graphite, polybenzimidazole (PBI), carbon powder, nanotubes and barium sulfate. The non-fibrous fillers may be introduced in the form of powder or flaky particles.

Preferably, said filler comprises one or more fillers selected from glass fibre, carbon fibre, carbon black and a fluorocarbon resin. More preferably, said filler comprises glass fibre or carbon, especially discontinuous, for example chopped, glass fibre or carbon fibre.

Said polymeric composition suitably includes 35-100 wt %, preferably 50-100 wt %, more preferably 65-100 wt % of said polymeric material.

Said polymeric composition suitably does not include a reinforcing filler (e.g. carbon fibre) but may include a non-reinforcing filler (e.g. talc or carbon black) which may be included to reduce costs and/or to colour the pipe. However, such a filler could detrimentally increase the roughness of the inside of the pipe and therefore increase pipe losses in the fluid flowing through it. To address this, the inside of the pipe could be provided (e.g. by coextrusion) with a layer comprising substantially 100 wt % of unfilled polymeric material (e.g. the same polymeric material as in said polymeric composition).

Suitably, the total amount of filler in said polymeric composition is 65 wt % or less, or 60 wt % or less. Said polymeric composition may include 0-65 wt %, preferably 0-50 wt %, more preferably 0-35 wt % of filler. Preferably, said polymeric composition includes less than 5 wt % and, more preferably, includes substantially no filler means.

Preferably, said pipe consists essentially of a polymeric material of formula (XX) and, especially, consists essentially of polyetheretherketone.

Said pipe may be part of an assembly. Said assembly may comprise said pipe as an inner part which is surrounded by an outer part. Said outer part is preferably arranged around substantially the entirety of the circumferential outer wall of said pipe. Said outer part may be arranged to reinforce the pipe; it is suitably arranged to resist mechanical and/or thermal loads to which said assembly may be exposed in use. For example, said outer part may be arranged to restrict compression of said pipe due to the weight of water that may act on it in use and/or to restrict expansion of said pipe due to flow of a hot pressure fluid therethrough in use. Said outer part of said assembly may comprise a first material and a second material. Said first material may comprise a thermoplastic or thermosetting resin. Said resin may be of any suitable type, for example a polyamide, polysulphone, polyetherimide, polyethersulphone or any of the polymeric materials comprising (a) phenyl moieties; (b) ketone and/or sulphone moieties; an/or (c) ether and/or thioether moieties described above for said pipe. Preferably, said first material is selected from homopolymers or copolymers comprising units IV and/or V referred to above. More preferably, said first material is of general formula (XX) as described above.

Said second material may comprise a fibrous material. Said fibrous material may independently have any feature of the fibrous filler described above in the context of filler optionally included in said pipe. Said fibrous material may be continuous or discontinuous. It is preferably selected from glass, aramid or carbon fibres.

Said outer part may include 25-75 wt % (more preferably 35-75 wt %) of said first material and 25-75 wt % (more preferably 25-65 wt %) of said second material. Said outer part may comprise a substantially homogenous arrangement of said first and second materials.

The outer part is preferably flexible and arranged to be wrapped around said pipe. It may be elongate and it may comprise a tape, mat or woven structure.

Said outer part may define a reinforcing layer around said pipe of a thickness of at least 0.25 mm, at least 0.5 mm or at least 1 mm. The thickness may be in the range 1 mm to 80 mm, for example 1 mm to 50 mm. The outer part may itself comprise many layers (e.g. greater than 10, 25, 40, 70 or 90 layers) of, for example tape, overlaying one another.

According to a second aspect of the invention, there is provided a method of making a pipe, for example a pipe of the first aspect, the method comprising:
(i) selecting a calibrator device which includes an elongate opening for receiving a hot extruded pipe, wherein said opening includes a vacuum applying region arranged to apply a vacuum to a pipe within the opening, said device further including at least two cooling regions which are spaced apart along its extent, said cooling regions being arranged to cool a pipe within the opening;
(ii) selecting the respective level of vacuum to be applied to said vacuum applying region;
(iii) selecting the respective level of cooling to be applied by said cooling regions;
(iv) introducing a hot extruded pipe into said elongate opening in said calibrator and conveying said pipe through said elongate opening;
(v) applying a vacuum to said pipe in said vacuum applying region; and cooling said pipe in said cooling regions as the pipe is conveyed along said elongate opening.

Said elongate opening suitably includes a mouth at an end for receiving the extruded pipe, wherein said mouth includes an outer surface which is cooled in order to solidify said hot pipe (e.g. the outer surface only of the pipe), on contact therewith and facilitate its passage into and/or through the elongate opening. Said mouth is suitably tapered inwardly (on moving in the direction of insertion of the pipe thereinto). The outer surface of the mouth (which suitably contacts the pipe in use) is suitably cooled. It is suitably cooled to a temperature which is lower than the temperature of a surface of the elongate opening which contacts said pipe which is immediately downstream of said mouth.

The method may include manufacturing the pipe in an extruder and directing hot (e.g. molten) pipe from said extruder into said calibrator to control the crystallinity of the pipe as described.

The method may include independently controlling at least two of said cooling regions so that the surfaces of the two regions which contact the pipe in use are arranged to cool the pipe at different rates and/or said surfaces may be cooled to different temperatures.

The method of the second aspect may be for making a pipe of the first aspect.

According to a third aspect of the invention, there is provided a calibrator device for manufacturing a pipe, said calibrator device including an elongate opening for receiving a hot extruded pipe, wherein said opening includes a vacuum applying region arranged to apply a vacuum to a pipe within the opening, said device further including at least two cooling regions which are spaced apart along its extent, said cooling regions being arranged to cool a pipe within the opening.

Said device may be for carrying out the method of the second aspect.

Said device may be for producing a pipe according to the first aspect.

As described according to the first aspect, a continuous length of pipe may be extruded and this may be cut into individual lengths, for example of at least 0.4 m, at least 0.6 m, at least 1 m or at least 2 m. The individual lengths may be less than 10 m or less than 5 m. Advantageously, the cut lengths are substantially the same as one another, for example in terms of residual stress (suitably as described according to the first aspect) and/or crystallinity. Thus, in a fourth aspect, there is provided a collection of lengths of pipe (preferably comprising at least 5 lengths of pipe of the same dimensions) having a residual stress as described accordingly to the first aspect and/or have a difference in crystallinity as described according to the first aspect The collection of lengths may be juxtaposed but not connected to one another; or the lengths may be connected to define a combined length of said pipes.

DESCRIPTION OF THE DRAWINGS

Specific embodiments of the invention will now be described, by way of example, with reference to the accompanying drawings, in which:

FIGS. 7a and 7b are plan views of rings made from pipes manufactured according to the prior art and invention respectively.

DETAILED DESCRIPTION OF THE DISCLOSURE

Figure 1:
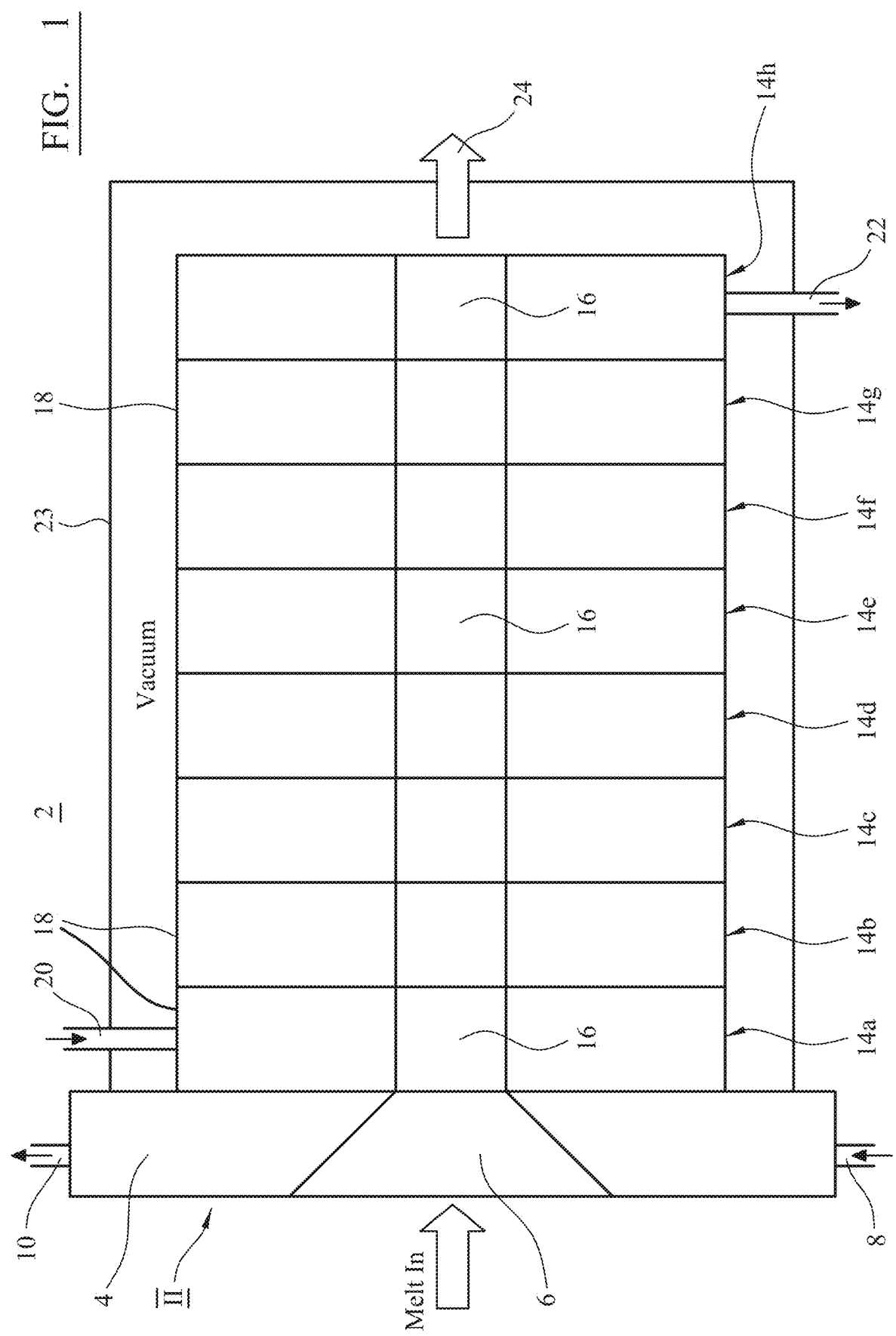
FIG. 1 is a schematic diagram of a calibrator for use in production of pipes.
Figure 2:
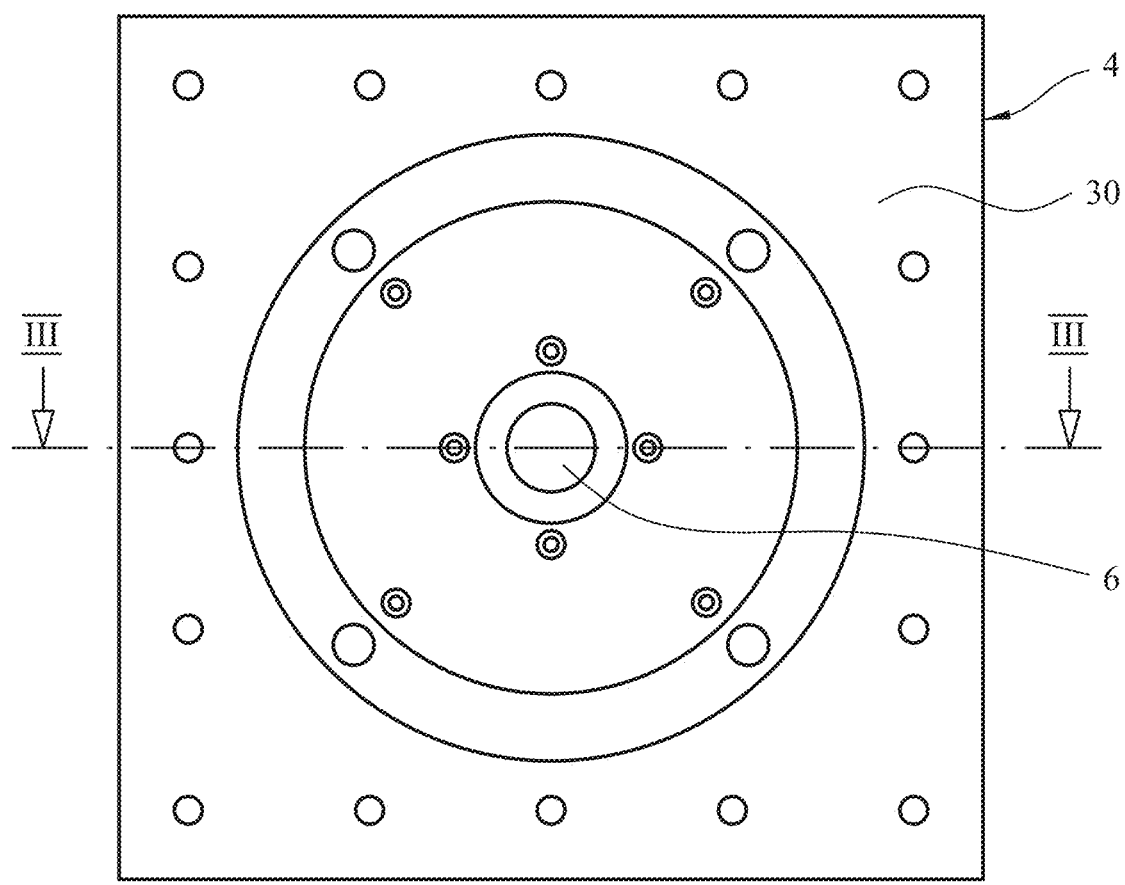
FIG. 2 is a front view in the direction of arrow II of FIG. 1, in more detail.

In the figures, the same or similar parts are annotated with the same reference numerals.

The following material is referred to hereinafter

VICTREX PEEK refers to polyetheretherketone grade 450G obtained from Victrex, Thornton Cleveleys, UK.

In the figures, the same or similar parts are annotated with the same reference numerals.

Referring to FIG. 1, the calibrator 2 comprises a front member 4 which includes a centrally positioned inwardly tapering cone-shaped opening 6 arranged to receive molten extruded pipe-shaped polymer. The front plate includes internal channels (not shown in FIG. 1) for receiving coolant for cooling the molten polymer. An opening communicates with the internal channels and defines an inlet 8 for coolant and an outlet 10 communicates with the channels and provides an outlet for coolant. In addition, front member 4 incorporates openings (not shown in FIG. 1) which extend from the outside and open into cone-shaped opening 6, so that a passageway extends from outside the front member to opening 6 via which passageway a vacuum may be applied to the outside of a pipe precursor present within opening 6.

Attached to the front member 4 is a vacuum plate 14a and successive vacuum plates 14b-14h are attached to one another to define an array of vacuum plates. Each vacuum plate includes a circular opening 16 arranged such that the openings together define a circular cross-section opening which is axially aligned with cone-shaped opening 6 so that an extruded pipe precursor formed can pass through openings 6, 16.

The vacuum plates 14 also incorporate openings (not shown in FIG. 1) which extend from outer cylindrical walls 18 thereof and open into circular opening 16 so that a passageway extends from outside each vacuum plate 14 to the circular opening 16 defined therein. The passageway enables a vacuum to be applied to a pipe precursor passing through openings 16.

The vacuum plates 14 also include temperature control means for heating or cooling the plates and therefore heating or cooling a pipe precursor passing through the openings 16. In one embodiment, vacuum plate 14a may include a fluid inlet 20 for a heating or cooling fluid and plates 14a to 14h are arranged for passage of heating/cooling fluid from inlet 20 via passageways defined in each plate 14a to 14h and out of outlet 22 in plate 14h. In another embodiment, each vacuum plate may include a respective inlet and outlet, such that each respective vacuum plate 14 is served by its own heating/cooling fluid and each vacuum plate 14 can therefore be individually cooled or heated to a predetermined temperature as may be required. In the latter embodiment, adjacent plates may be thermally insulated from one another to facilitate individual temperature control.

The array of vacuum plates 14 is arranged within an hermetically sealed housing 23 in which a vacuum can be produced by suitable means (not shown). The vacuum is communicated via the passageways which extend from outside each vacuum plate 14 to the circular openings 16 so that the vacuum can be applied to a pipe precursor passing through openings 16.

In general terms, the FIG. 1 apparatus may be operated as follows.

Initially, a vacuum is applied to openings 6, 16 and heating/cooling fluid is passed through plates 14 via the inlet 20 and outlet 22 (or via respective inlets/outlets associated with each plate); and heating/cooling fluid is passed through inlet 8 and outlet 10 of front member 4. Also, coolant is passed through front plate 4 via openings 8, 10.

An extruded hot plastics pipe precursor of appropriate diameter and thickness defined by a pipe die fixed to the extruder is then inserted into calibrator 2 via opening 6. The temperature of member 4 is such as to freeze the outside wall of the pipe precursor and stop it sticking to member. Thereafter, the pipe precursor is conveyed through openings 16 in plates 14. During passage of the pipe precursor 16, it is urged by the vacuum against the cylindrical surface defined by plates 14 to maintain its shape and the temperatures of each plate is controlled to control the rate of cooling of the pipe precursor passing through. The formed pipe exits the calibrator 2 as represented by arrow 24, after which it may be allowed to cool to ambient temperature.

The heating/cooling of plates 14 may be adjusted to cool the pipe precursor at a relatively constant rate. A relatively slow rate may be selected so that a pipe made from a relatively fast crystallizing polymer (like polyetheretherketone) crystallises so that the crystallinity of the pipe along its extent and throughout its thickness is substantially constant. A pipe may therefore be made which has low or negligible residual stress.

As an alternative, the calibrator may be used to deliberately form a pipe having different levels of crystallinity across its thickness. For example, a pipe may be made having a skin which is relatively amorphous with the wall of the pipe inwards of the skin having relatively high crystallinity.

FIGS. 2 to 5 show parts of the calibrator of FIG. 1 in more detail.

The front member 4 includes a square cross-section plate 30 which is arranged to define one wall of housing 23. Opening 8 for receiving coolant communicates with an annular opening 32 defined within a body 34 which also defines the opening 6 for passage of the pipe precursor. The coolant is arranged to circulate within the body 34 in order to cool the surface of opening 6. Outlet 10 also communicates with opening 32 for removing coolant from the body. Body 34 is suitably made from a thermally conductive material, for example brass.

The body 34 also defines a series of annular recesses 36 having mouths which open into opening 6 and which communicate with axial ports 38. Axial ports 38 are connected to passageways which extend to a position outside body 34 (in substantially the same manner as described with reference to FIG. 5 hereinafter) so that a vacuum can be applied to opening 6 by removal of gas from opening 6 via recesses 36 and axial ports 38.

Figure 3:
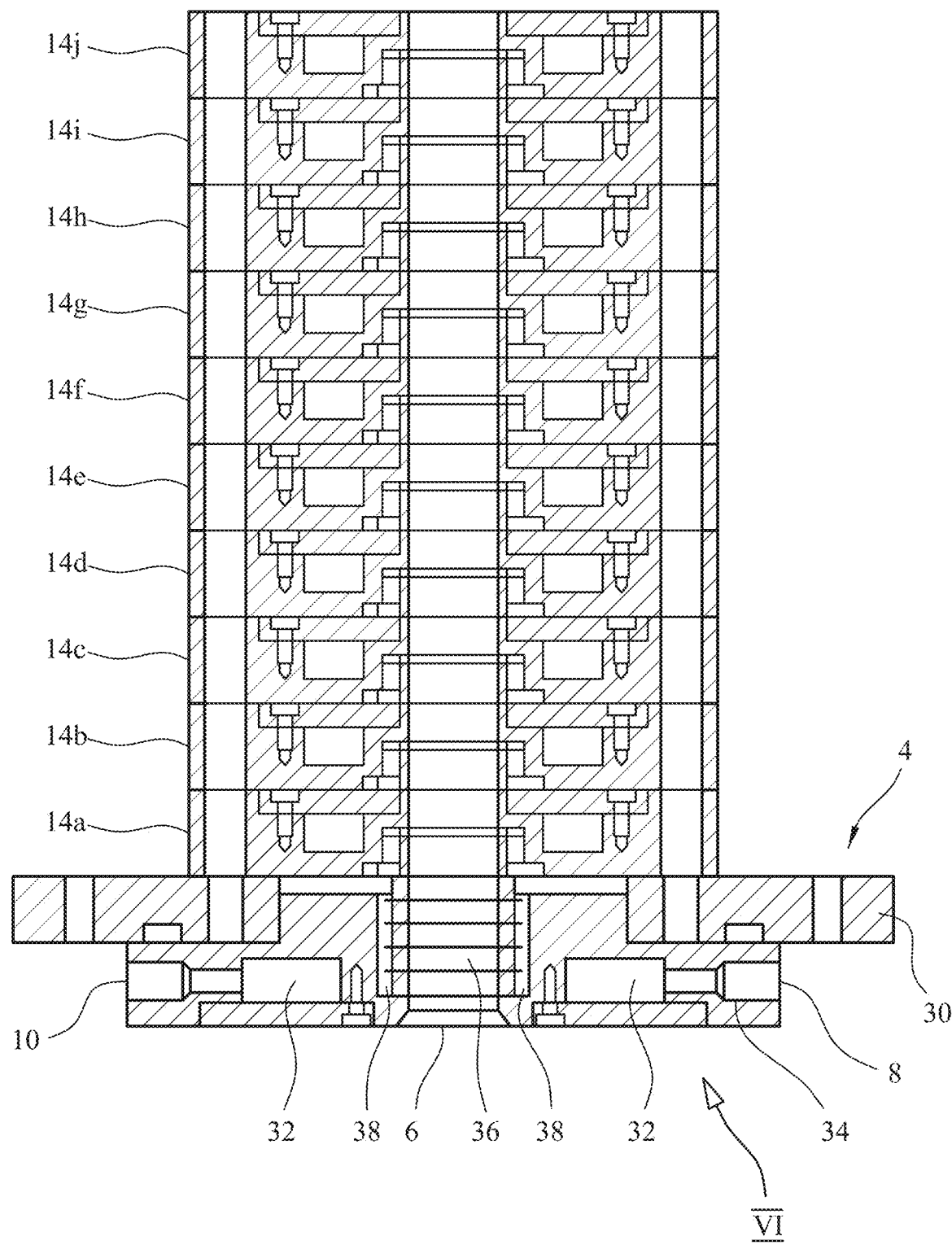
FIG. 3 is a cross-section along line III-III of FIG. 2.

In FIG. 3, vacuum plates 14a-j are shown which are identical. More or fewer such plates may be provided as required for any particular situation.

Figure 4:
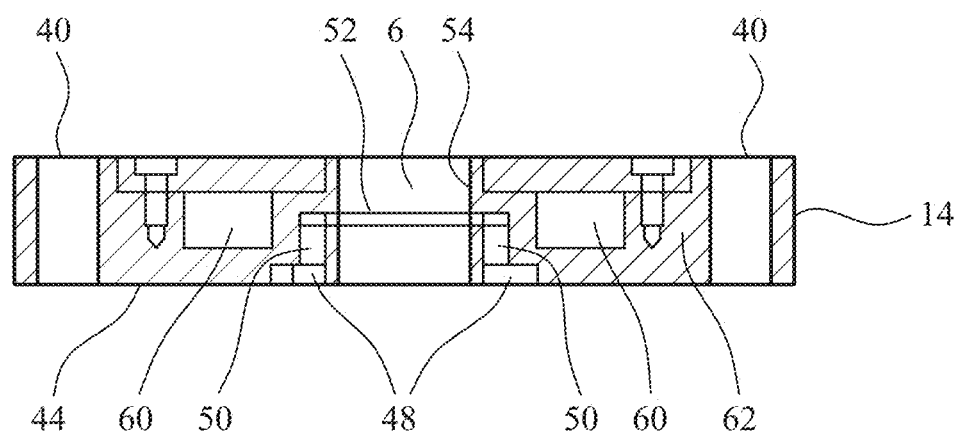
FIG. 4 is a cross-section through one vacuum plate.
Figure 5:
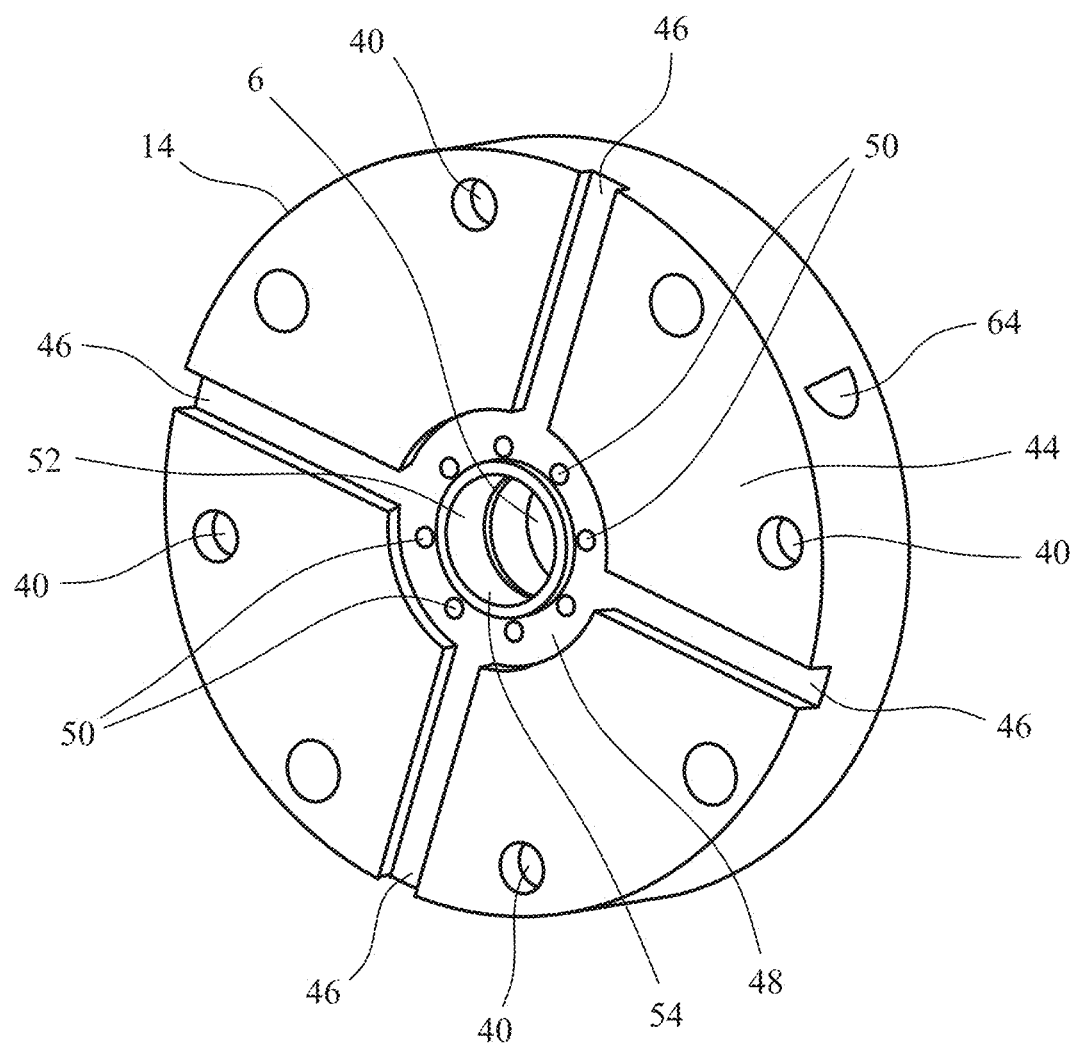
FIG. 5 is a perspective view of the vacuum plate.
Figure 6:
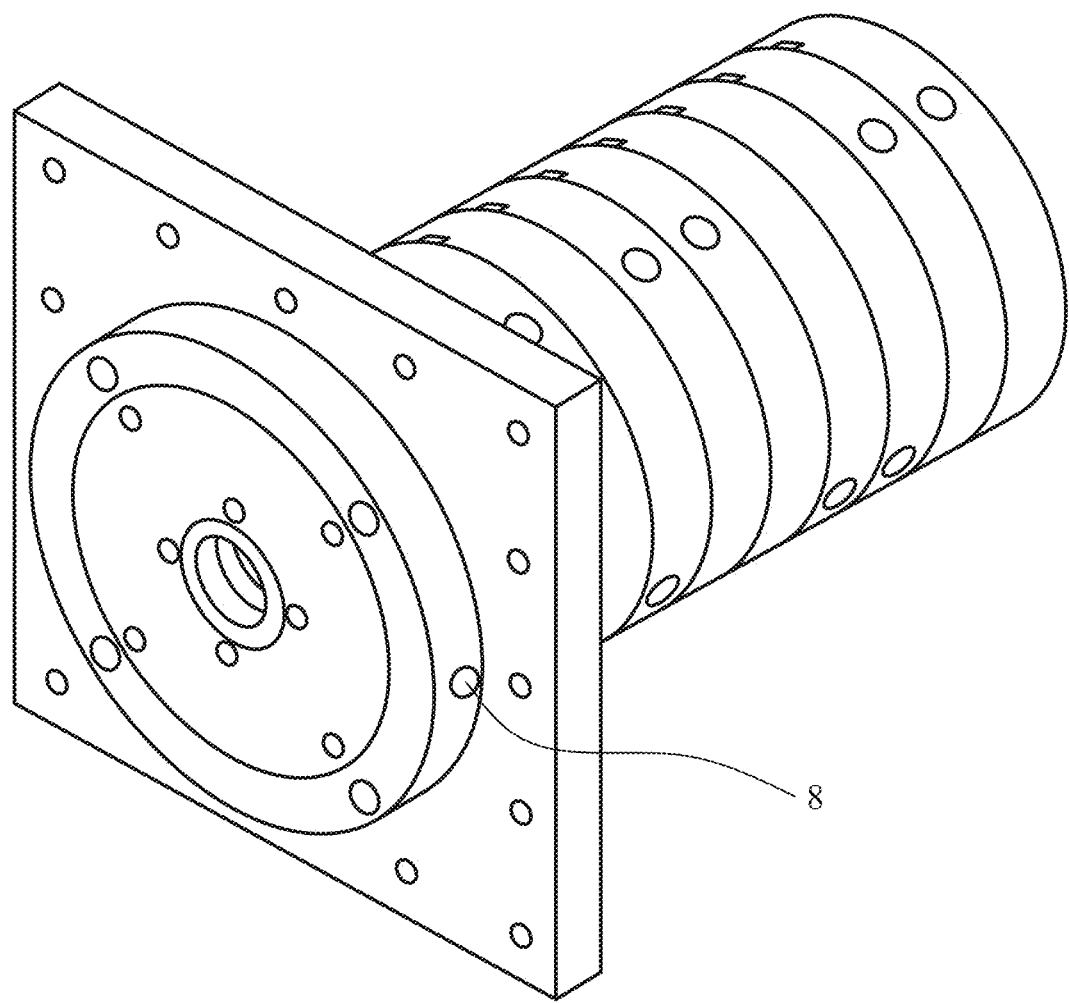
FIG. 6 is a perspective view in the direction of arrow VI of FIG. 3.

Each vacuum plate 14 may be as shown in FIGS. 4 and 5. The plate 14 includes ports 40, via which one plate may be secured to another. At one side 44, four radially-extending cut-outs 46 (FIG. 5) are defined which communicate with an annular cut-out 48 which includes eight axially-extending elongate openings 50 defined within it. The openings 50 communicate with an annular slot 52 defined in wall 54 which defines circular opening 16. Thus, an airflow passageway is defined which extends from opening 6, via slot 52, axially-extending openings 50 and cut-outs 46 to a position outside the plate 14 by means of which the vacuum can be applied to a pipe precursor arranged within opening 6.

Plate 14 also includes an annular opening 60 defined within body 62 which communicates with radially-extending ports in the body (e.g. port 64 in FIG. 5 and a diametrically opposing port not shown) for circulating coolant/heating fluid within the body 62 to cool/heat it. It will be appreciated that each plate 14 may have its own supply of coolant/heating fluid so that the temperature of each plate 14 may be individually controlled. By selection of appropriate dimensions for the radially-extending ports and the output of the pump used to circulate the fluid, the fluid may be caused to flow turbulently within the body. Plate 14 is suitably arranged so that the temperature of wall 54 is substantially the same across its surface area.

The plates 14 are suitably arranged (e.g. by use of coolant/heating fluids of appropriate temperature) in such a way as to avoid large/abrupt temperature changes across a surface of wall 54 of an individual plate 14 and between adjacent plates 14. In use, to this end, adjacent plates 14 may be arranged with the ports via which fluid is delivered to opening 6 (e.g. port 64 in FIG. 5) and removed therefrom being staggered relative to one another and/or the inlet for fluid for a first plate 14 may be on a first side of the calibrator and the outlet may be on an opposite side, whereas the second plate 14 adjacent the first plate 14 may have its inlet for fluid on the second side and its outlet on the first side. Alternatively, inlets of adjacent plates 14 may be staggered at 45° to one another; and outlets may be arranged similarly.

Thus, by providing a series of separate plates 14, the temperature of specific regions along the calibrator may be individually controlled. More or fewer plates 14 may be included to adjust the length of the calibrator, to allow it to be used to process pipes at different speeds—e.g. a longer calibrator may be used to process pipes at lower speeds. In addition, in some embodiments, it may be desirable to use a variable vacuum (e.g. vary the level of vacuum between groups of plates), to facilitate production of a circular cross-section pipe.

The calibrator may be of utility in the manufacture of pipes from a range of polymeric materials. It may be particularly advantageous in the manufacture of pipes from crystallisable polymeric materials having relatively high glass transition temperatures (because for such high Tg polymers, conventional water quenching ensures a too high rate of temperature drop to below Tg which generates additional stress) and/or polymeric materials which are relatively fast crystallizing. In the latter case, if such a polymeric material is cooled too quickly it will crystallise to different extents from one side of the pipe to an opposite side leading to different levels of crystallinity across the pipe, which may lead to problems as herein before described.

Examples of polymeric materials which may advantageously be used in the manufacture of pipes using the calibrator include polyaryletherketones, for example polyetheretherketone (PEEK) and polyphenylene sulphide (PPS).

The calibrator 2 has great versatility for controlling and/or defining crystallinity in a desired manner for pipes of a range of cross-sections and wall thicknesses. Steps in manufacturing a pipe in a desired form include the following:

(i) Selecting the pipe diameter and wall thickness. For example, for very thin wall pipes (e.g. of 0.5 mm minimum wall thickness), it is difficult to avoid producing a relatively low crystallinity (often referred to as "amorphous") skin due to rapid cooling of the outer wall of the pipe. Thus, the wall thickness will have a bearing on other variables associated with the calibrator. Similarly, the pipe diameter will have implications for the design of the calibrator and ensuring desired cooling rates are achieved.

(ii) Selecting the calibrator. Although FIG. 3 shows a calibrator having ten vacuum plates 14, fewer or more plates may be included, for example, if it is desired to increase the speed of passage of a pipe through the calibrator, but maintain the cooling rate, then the calibrator may be extended. A doubling of the speed of passage may necessitate a doubling of the number of plates 14. Similarly, shorter calibrators may be used for lower speed throughput.

(iii) Selecting the temperature of each plate 14 and adjusting the temperatures and/or identity of heating/cooling fluid used. For example, when the FIG. 3 calibrator is used to make a PEEK pipe, the first member 4 may be cooled to maintain it in use at a temperature of 80° C. or below to freeze the outside of the molten PEEK pipe precursor on entry into the calibrator and stop it sticking within opening 6. In addition, the plates 14a and 14b may be cooled (typically to within the range 100° C. to 200° C., although some plates could be cooled to as low as 5° C.) to provide a gradual temperature transition to plate 14c and subsequent plates. It should also be borne in mind that for PEEK, the heat of crystallisation is emitted in the range 212-215° C. and the potential increase in energy will need to be offset by a lower temperature for the relevant plate 14, in order to provide gradual temperature changes and balanced thermodynamics along the calibrator. In a typical example, all of the plates may be substantially the same temperature (e.g. about 70 to 120°).

Typically, water may be used to cool first member 4; and oil may be used to cool the other plates. 0:1 cooling may be used in some circumstances.

After selecting and setting up the calibrator, taking relevant variables into consideration, a pipe having a desired level and/or arrangement of crystallinity may be manufactured.

Initially, the calibrator 2 is readied by operating a vacuum device to extract air from within housing 23 and thereby apply a vacuum, as described, around opening 6 through which a pipe precursor is to pass. Also, heating/cooling fluid as applicable is passed through front member 4 and vacuum plates 14 so they reach equilibrium at a desired temperature. PEEK is then extruded using suitable apparatus to produce a molten pipe precursor which is introduced into cone-shaped opening 6. A melt skin is formed on the molten pipe by contact of the melt with front plate 4 which is cooled as described. The front plate defines a taper angle of about 45° which is found to be optimum for capturing the molten pipe and cooling it. (The taper angle is the angle defined between an elongate axis of the front plate and the cone-shaped wall of the front plate). If there is insufficient cooling, the melt is too weak; and if the cooling is too great the melt sticks to the plate and the extrudate piles up on plate 4 and does not progress along the calibrator.

Typically, the speed of introduction and/or passage of the pipe precursor into and through the calibrator may be at a constant rate, suitably in the range 0.1 m/min to 10 m/min.

As the pipe precursor enters opening 6, its outer surface solidifies to prevent it sticking within the opening as described above. Then the pipe precursor passes through successive plates 14, wherein it is gradually and controllably cooled, for example to maximise its crystallinity and maximize the homogeneity of its crystallinity—i.e. so that the crystallinity across the thickness of the pipe wall is substantially constant.

On passage from the calibrator, the pipe may be at an elevated temperature and may be wound around a reel and allowed to cool to ambient temperature; or it may be cooled, for example using water, before being wound round a reel. In an alternative embodiment, the pipe passing out of the calibrator may be cut to specific lengths. Once the calibrator has been set up, it may be used to manufacture a very long length of pipe (e.g. as much at 3000-4000 m) having consistent properties, for example crystallinity along its extent; or it may be used to manufacture shorter lengths of pipe which have consistent properties. The calibrator may be particularly suitable for manufacturing pipes having an SDR (Standard Dimension Ratio) (diameter of pipe to thickness of pipe wall ratio) of greater than 6. The advantageous nature of pipes made as described may be illustrated by measuring the residual stress in the pipe. This may be measured as described in Example 1.

Example 1—Measurement of Residual Stress (Split-Ring Methods)

In general, when a pipe is cooled, the polymeric material closest to the bore of the pipe will cool slower than the outer surface of the pipe and consequently there may be different levels of crystallinity across the thickness of the pipe wall—crystallinity may be highest towards the centre of the pipe compared to the outer surface. Differences in crystallinity across a pipe wall set up different stresses in the pipe—the residual hoop stress is tensile on the pipe bore and compressive on the outer surface. This effect can be used in assessing residual stress in a pipe by cutting a ring from a pipe, forming a slit in it and assessing the split ring as it closes up in a controlled test.

Two methods are described below for assessing residual stress; the first method is more appropriate for smaller diameter pipes (e.g. up to 20 mm diameter) and the second method for larger diameter pipes (e.g. above 20 mm diameter).

Method 1

Rings can be cut from the pipe and the wall thickness and original diameter (outside diameter) and average radius measured with appropriate instruments. The pipe is then slit in the axial direction through a radius of the pipe. The slit closes in upon itself. The final diameter is then measured (average of at least two positions at 90° to each other). The residual hoop stress may then be estimated from the following equation:

$$\sigma_R = Eh(\Delta D)/(4\pi r^2)$$

where E is the modulus of the pipe material, $\Delta D$ is the change in outside diameter, r is the average radius and h is the wall thickness.

The following table summarises the results for a 6.3 mm internal diameter PEEK pipe having a 1.22 mm wall thickness which was 'crash cooled' using water in a conventional sleeve calibrator and a pipe of the same dimensions which was fabricated using the novel apparatus described herein.

|  | Pipe | |
| --- | --- | --- |
|  | Water Cooled (Prior art) | Apparatus described herein (invention) |
| Residual Stress (MPa) | 6.7 | 2.4 |

Method 2

Rings can be machined from a pipe and the widths, diameters and average wall thicknesses measured. The rings are then slit axially as per Method 1, and then pulled apart on a mechanical testing machine using a thin wire to apply the load (see the Hodgkinson paper referred to hereinafter). The load versus deformation trace shows an initial rise followed by a clear change in gradient as the ring parted passes its 'un-slit' position and begins to open out.

The maximum level of residual stress, $\sigma_R$, in the pipes can be determined from the formula $$\sigma_R = 1.5 P_1 (D-h)(1+1/\pi)/L\, h^2$$

where $P_1$ is the load at which the trace changes gradient and the split ring parts, D is the external diameter, h is the wall thickness and L is the length of the pipe sample This assumes that residual stress is tensile on the pipe bore and compressive on the outer surface, which is why the split rings close.

The following table summarises the results for a 5" (Ω12.7 cm) diameter PEEK pipe which was 'crash cooled' using water in a conventional sleeve calibrator and an 8" (Ω20.3 cm) diameter pipe which was fabricated using the apparatus described herein.

|  | Pipe Size | |
| --- | --- | --- |
|  | 5" Pipe | 8" Pipe |
| Residual Stress (MPa) | 7.26 | 1.64 |

The residual stress calculated for the 5" pipe (7.26 MPa) is significantly higher than that calculated for the 8" pipe (1.64 MPa). This can be seen in FIGS. 7(a) and (b) where greater closure (FIG. 7a) corresponds to higher residual stress.

The residual stress for the 5" pipe is ~7% of the yield stress, whereas the residual stress for the 8" pipe is ~1.5% of the yield stress: the residual stress in the 5" pipe might be expected to have a significant influence on pipe performance.

Further detail on the test methods described can be found in "Residual Stresses in Plastics Pipes", J. M. Hodgkinson and J. G. Williams, Deformation, Yield and Fracture of Polymers, Cambridge, 1982, the content of which is incorporated herein by reference.

The invention claimed is:

1. A calibrator device for manufacturing a pipe having a length of at least 1 m and a residual stress of less than 5 MPa, said pipe comprising:
   a polymeric material which includes:
      (a) phenyl moieties;
      (b) ether and/or thioether moieties; and, optionally,
      (c) ketone and/or sulphone moieties,
   wherein the polymeric material exhibits a crystallinity half-life ($t_{0.5}$) at 15° C. above its glass transition temperature (Tg) of less than 1000 seconds; wherein the thickness of a wall which defines the pipe is in the range of 0.6 mm to 6 mm or for use in a method comprising:
- (i) selecting a calibrator device which includes an elongate opening for receiving a hot extruded pipe, wherein said opening includes a vacuum applying region arranged to apply a vacuum to a pipe within the opening, said device further including at least two cooling regions which are spaced apart along its extent, said cooling regions being arranged to cool a pipe within the opening;
- (ii) selecting the respective level of vacuum to be applied to said vacuum applying region;
- (iii) selecting the respective level of cooling to be applied by said cooling regions;
- (iv) introducing a hot extruded pipe into said elongate opening in said calibrator and conveying said pipe through said elongate opening;
- (v) applying a vacuum to said pipe in said vacuum applying region; and cooling said pipe in said cooling regions as the pipe is conveyed along said elongate opening, said calibrator device including an elongate opening for receiving a hot extruded pipe, wherein said opening includes a vacuum applying region arranged to apply a vacuum to a pipe within the opening, said device further including at least two cooling regions which are spaced apart along its extent, said cooling regions being arranged to cool a pipe within the opening, and each of said cooling regions having a vacuum plate, wherein each vacuum plate is independently temperature-controlled with respect to the other vacuum plate.

* * * * *